United States Patent [19]

Reick

[11] 3,931,428

[45] Jan. 6, 1976

[54] SUBSTRATE COATED WITH SUPER-HYDROPHOBIC LAYERS

[75] Inventor: Franklin G. Reick, Westwood, N.J.

[73] Assignee: Michael Ebert, Mamaroneck, N.Y.; a part interest

[22] Filed: Jan. 4, 1974

[21] Appl. No.: 430,621

[52] U.S. Cl. ............... 428/149; 427/322; 427/385; 427/386; 427/387; 428/159; 428/331; 244/134
[51] Int. Cl.² ..... C08J 7/04; C08J 9/42; D06N 7/04
[58] Field of Search ........ 117/98 F, 100 C, 138.8 E, 117/138.8 R, 138.8 F, 169 A, DIG. 9, 47 R, 62, 62.5, 9, 161 UZ

[56] References Cited
UNITED STATES PATENTS

| | | | |
|---|---|---|---|
| 2,342,979 | 2/1944 | Spicer | 244/134 |
| 2,471,224 | 5/1949 | Loughborough | 244/134 |
| 2,567,804 | 9/1951 | Davies | 244/134 |
| 3,288,983 | 11/1966 | Lear | 244/134 X |
| 3,825,371 | 7/1974 | Roder et al. | 416/224 |

*Primary Examiner*—P. E. Willis, Jr.

[57] ABSTRACT

The technique for forming on a substrate an abrasion-resistant layer having super-hydrophobic properties. Applied to the face of the substrate which has an inherently hydrophobic micro-pile formation are hydrophobic fumed silicon dioxide particles dispersed in a hydrophobic solvent. Dissolved in the solvent is a resinous binder in a small but effective amount which, by weight, is substantially less than one half the amount of the particles in the dispersion. Upon volatilization of the solvent, the resultant layer is composed primarily of fumed silicon dioxide particles strongly bonded to the face of the substrate.

13 Claims, No Drawings

SUBSTRATE COATED WITH SUPER-HYDROPHOBIC LAYERS

BACKGROUND OF THE INVENTION

This invention relates generally to substrates having a hydrophobic layer formed thereon and to products which include such treated substrates, and more particularly to techniques for fabricating products in which the layer incorporates hydrophobic fumed silicon dioxide.

A hydrophobic substance is one having a distinct tendency to repel water in a manner usually characteristic of non-wetted, oily, waxy or fatty materials. A hydrophobic surface will normally not sustain a water slim, even one of monomolecular thickness. This property not only is found in all oils, fats, waxes and many resins, but also in finely-divided powders such as carbon black and magnesium carbonate.

A hydrophilic substance has a strong affinity for water by absorption or adsorption even to the point of gradual liquifaction by extracting water vapor from the atmosphere. This property is characteristic of carbohydrates such as algin, vegetable gums, pectins and starches as well as complex proteins like gelatin and albumen.

The present invention deals with a hydrophobic layer formed on a substrate, which layer incorporates particles of hydrophobic fumed silicon dioxide (HFSD). Silicon dioxide particles are produced by the hydrolysis of silicon tetrachloride in a flame process. The fumed silicon dioxide particle is hydrophilic in nature by reason of the large number of hydroxyl groups present on the surface. These particles are rendered hydrophobic by reacting them with a silane. During the reaction, hydrophobic hydrocarbon groups replace many of the hydroxyl groups, the resulting particles offering increased compatibility with organic or non polar media and a corresponding repulsion to water. One commercially available form of hydrophobic fumed silicon dioxide powder is manufactured and sold by Cabot Corporation of Boston, Massachusetts under the trademark "Silanox".

Silane which is a member of the silicone family, contributes its inherent hydrophobicity and oleophilicity to the HFSD particle. Fumed silicon dioxide, which is a fine pure powder, brings to HFSD a particle of extremely small size and enormous surface area, all of it being accessible for interaction with the surrounding media. In protective coatings, the hydrophobicity derived from the silane component of HFSD is augmented by the surface micro-roughness imparted by the silicon dioxide component, giving rise to a degree of water repellency so great that it is often referred to as super-hydrophobicity.

Substrates coated with HFSD repel water to an extraordinary degree. An air layer becomes entrapped between the substrate and the water and is visible as a reflected silvery sheen. This air layer or shield is sometimes referred to as a gaseous plastron. In order therefore to protect metal against corrosion, one may apply thereto a coating of HFSD which functions to insulate the metal surface from water by means of an air layer. Similarly, ice build-up on ship and airplane surfaces may be alleviated by the application thereto of an HFSD coating which causes ice release due to the minimal interfacial contact between the ice and the tiny particles of HFSD.

The super-hydrophobic properties of HFSD can be imparted to substrates in various ways. HFSD particles can, for example, be applied in dry form on tacky surfaces, or it can be applied from a liquid dispersion. But regardless of the mode of applying HFSD to the substrate, it is important that these particles remain essentially uncoated and exposed at the solid-water interface to afford the micro-roughness necessary for optimum super hydrophobicity.

One serious difficulty often encountered in HFSD coatings is its poor abrasion resistance, for if the coating is subjected to wear, it may be eroded, with a consequent loss of super-hydrophobicity and a possible gain in hydrophilic properties should the underlying substrate be hydrophilic in character.

Heretofore, in order to attain a high degree of abrasion resistance, it was the practice to use conventional powder coating methods such as fluid-bed or electrostatic spraying techniques to deposit a blend of dry powder fluids of HFSD and fine resinous powders onto the substrate. Heat is then used to activate the powder resin to allow wetting of the HFSD particles and to thereby bond these particles to the substrate. Typical blends for this purpose make use of as little as 5% to 10% by weight of HFSD in combination with epoxy, vinyl or polypropylene powders to produce coatings having the desired hydrophobic characteristics.

In as much as the binder component in such blends is dominant, the resultant coating is strongly influenced by the characteristics of the resinous binder which is generally much less hydrophobic than the HFSD particles. Moreover, since heat is required to effect bonding, this not only adds to the complexity and cost of the technique but in some instances it may adversely affect the structure of the substrate.

SUMMARY OF THE INVENTION

In view of the foregoing, it is the main object of this invention to provide an improved technique for coating substrates to render the face thereof super-hydrophobic.

More particularly it is an object of this invention to provide a product including a substrate having a super-hydrophobic face which is highly abrasion and scratch resistant.

Also an object of this invention is to provide a selective filter having super-hydrophobic properties whereby the filter is impermeable to water and permeable to other liquids or fluids.

Yet another object of this invention is to provide toys which exploit the natural repulsion existing between hydrophobic and hydrophilic surfaces to create an air cushion therebetween which minimizes friction encountered in a sliding movement of the hydrophilic relative to the hydrophobic surface.

Briefly stated these objects are accomplished by applying to the face of a substrate which has a micro-rough surface, hydrophobic fumed silicon dioxide particles dispersed in a solvent within which is dissolved a resinous binder whose amount, by weight, is substantially less than one-half of the amount of particles in the dispersion. Upon volatilization of the solvent, the resultant coating is composed predominantly of fumed silicon dioxide particles strongly bonded to the face of the substrate.

DESCRIPTION OF THE INVENTION

In determining the degree of hydrophobicity presented by a given surface, one must take into account two opposing forces. First there is the force of cohesion which is present in the water on the surface, this cohesive force causing water molecules to attract each other. The second force acting on the water is the force of adhesion which causes water molecules to attract the atoms or molecules on the surface. The relationship between these two opposing forces determines the degree of wetting of the surface by the water.

On a normally hydrophobic surface, such as wax paper, a drop of water retains its integrity, but there is sufficient surface adhesion to cause the drop to assume a somewhat flattened form on the wax paper. On a superhydrophobic surface formed by a HFSD coating or layer, the shape of the water drop is almost spherical in that the force of adhesion is almost negligible. On a completely wettable and hydrophilic surface, the force of adhesion is stronger than the force of cohesion and a water drop will quickly spread to cover the surface. Thus with hydrophobic surfaces the cohesive force is dominant and in such surfaces water droplets tend to draw together whereas in the hydrophilic surfaces the adhesive force is greater and overcomes the cohesive force.

Two factors come into play in determining the degree to which a surface is hydrophobic. First there is the chemical factor which is why oily, waxy or fatty materials repel water. But there is also a physical factor, for when surface roughness is present to create minute projections or fibrils, a water droplet tends to be supported only on the peaks of the projections. The air-filled troughs between the projections are free from contact with the water, thereby enhancing hydrophobicity. Exceptional water repellency or super-hydrophobicity may therefore be obtained by a merger of surface chemistry and micro-roughness. This phenomenon is often encountered in nature, such as on leaves and petals wherein a multiplicity of tiny hydrophobic fibrils act to repel water, thereby facilitating transpiration.

In the present invention, both the chemical and physical factors are exploited to provide a super-hydrophobic layer which is abrasion and scratch resistant and cannot easily be rubbed off, whereby the characteristics of the layer are maintained under rigorous operating conditions. In order to accomplish this result, it is essential that the substrate which is coated with HFSD also exhibit hydrophobic properties. We shall, therefore, first consider the nature of the substrate.

Substrates: One preferred form of substrate material is a layer of foam plastic formed of polyethylene or polypropylene having a very fine cell structure. Usable for this purpose is "Minicel" L-200, crosslinked polyethylene foam manufactured and sold by Hercules Incorporated of Wilmington, Del. A block of such foam material is skived to provide a layer sheet, thereby cutting open the cells in the face of the layer to create a multiplicity of fine pockets. As a consequence of these fine pockets, the face of the layer presents a myriad of cut-ends or projections which are inherently hydrophobic in character.

Another useful form of substrate is spunbonded olefin formed of high-density polyethylene fibers. Sheets or layers of this material are formed by first spinning continuous strands of very fine interconnected fibers and then bonding them together with heat and pressure. Though the dense packing of the fine, interconnected fibers produces a seemingly smooth surface, the surface is actually porous and has a very fine fuzz or uncut pile face which imparts thereto hydrophobic properties. One commercial form of spunbonded olefin is manufactured and sold by the DuPont Company under the trademark "TYVEK". As noted in the DuPont Technical information bulletin S-9 published March, 1973, "The Properties and Processing of Tyvek Spunbonded Olefin", this material is inherently hydrophobic.

Similar characteristics are found in spunbonded polyester sheets or layers formed by continuous filament polyester fibers that are randomly arranged, highly dispersed and bonded at the filament junctions. When these fibers are crimped, the resultant surface is fuzzy, imparting thereto a high degree of hydrophobicity. This product, which is manufactured and sold by DuPont under the trademark REEMAY, is described in the DuPont technical bulletin S-4 dated April 1970 "Properties and Processing of REEMAY Spunbonded Polyester".

In summary, the substrate to be coated by HFSD is formed of a material which is chemically hydrophobic and which has a micro-rough face which is physically hydrophobic, so that both hydrophobic factors are combined in the fine hairs or projections which constitute the face of the material. The term micro-rough as used in the specification and claims is intended to encompass any facial texture which is physically hydrophobic such as cusps, piles, projections, cuts-ends, flock and fibrils.

Substrate Coatings: The face of the substrate is sprayed or otherwise coated with hydrophobic fumed silicon dioxide particles dispersed in a solvent that is chemically hydrophobic, within which solvent is dissolved a resinous, thermoplastic binder that is chemically hydrophobic. Thus when the coating is dried or cured, all constituents thereof including trace elements are hydrophobic in character and the resultant treated substrate is super-hydrophobic and highly resistant to abrasion and other damaging effects. Thus even when an area of the super-hydrophobic surface becomes eroded, the exposed area remains hydrophobic and in no instance is a hydrophilic area created because of wear or abrasion.

A preferred form of HFSD is Silanox 101 manufactured by Cabot Corporation, which is a silane-modified silicon dioxide in finely divided powder form. The surface area of this powder is 225 m$^2$/gm (BET), the primary particle size is 7 $\mu$ and the bulk density is 3 lbs. per cubic foot.

In order to form a dispersion of the HFSD particles, use is made of a solvent which is inherently hydrophobic and capable of dissolving the binder for the HFSD particles. A preferred solvent for this purpose is trichloroethylene (CH Cl: CCl$_2$) which is a stable, colorless heavy liquid derived from tetrachloroethane by treatment with lime or alkali in the presence of water, or by thermal decomposition followed by steam distillation. Also usable as a solvent is perchloroethylene (Cl$_2$ C: CCl$_2$) or benzene (C$_6$H$_6$).

The preferred form of binder which is dissolved in the solvent is high impact polystyrene (C$_6$H$_5$CHCH$_2$) which is a thermoplastic synthetic resin of variable molecular weight depending on the degree of polymerization. Also usable as a binder are polyvinyl resin or copolymers of ethylene and vinyl acetate. These binders are all thermoplastic in nature and have hydrophobic properties.

It is important that the amount of binder by weight be no more than is necessary to effectively bond the HFSD particles to the face of the substrate so that the resultant covering is predominantly HFSD and is super-hydrophobic. Thus the ratio of the binder by weight to the HFSD particles must be less than 50 : 50.

One acceptable formulation for the dispersion is the following:

Solvent — 1500 cc of trichloroethylene
Binder — 20 grams of high impact polystyrene
HFSD — 35 grams of Silanox In practice, the amount of binder in this formation may be further reduced to as low as 10 grams relative to 35 grams of Silanox.

In preparing the dispersion, the binder is first fully dissolved in the solvent, and then the HFSD particles are added to the solvent in a Waring blender or other suitable mixer and stirred therein for a few seconds to completely disperse same without excessive agitation. In applying this dispersion to the face of a substrate, a wet spray technique may be used. When the solvent volatilizes, strongly bound to the fibrils or the cut-ends of the substrate face is a fine coating containing HFSD particles. The resultant surface is extraordinarily water-repellent and resistant to abrasion and other wear conditions.

In those instances where the surface may be subjected to very heavy wear, its abrasion resistance may be augmented by a calendering technique in which the treated surface is run under a heated pressure roll, pressing the coating into more intimate relationship with the substrate without, however, impairing the character of the substrate. In this operation the calendering temperature and pressure conditions must be such as to avoid fusing the fibrils of the substrate.

Applications: Ice build-up is a serious hazard in airplanes. Using conventional techniques, one cannot successfully apply to the wings or fuselage of a plane a super-hydropholic coating which will withstand the wear forces to which these surfaces are subjected. However, by forming a superhydrophobic surface on the outer face of a Tyvek or Reemay sheet in the manner previously described, and adhering the underface of this sheet to the skin of the plane, it then becomes possible to prevent icing on a long-term basis, the surface being highly resistant to wear factors encountered in flight. Since these sheets are quite thin, they do not alter the aerodynamic characteristics of the wings or fuselage. Alternatively, where the skin of the plane is made of aluminum, use may be made of aluminum sheeting which has been electrochemically etched or otherwise processed to form a micro-rough surface to which the HFSD dispersion may be directly applied.

In practice, pressure-sensitive bonding techniques may be used to clad the super-hydrophobic sheet on the skin of the plane, so that it becomes a relatively simple matter to replace these sheets when necessary. And because of the boundary layer characteristic of the super-hydrophobic surfaces, a significant reduction in air resistance may be effected, with a consequent gain in air speed and fuel economy.

Because a HFSD-treated Tyvek or Reemay sheet is porous it may be used as a selective filter to separate water from gasoline or any other liquid or fluid in a mixture or emulsion containing water and another constituent. The water is repelled and blocked by the sheet despite the fact that it is porous, whereas the treated sheet is permeable to gasoline or whatever other constituent is contained in the mixture or emulsion.

This selective filter, which is preferably made in conical form, may be placed as a plug in a gasoline line, the plug acting to pass the gasoline but to impede the flow of water, thereby filtering out the water. The reason for the conical form is to increase the effective surface of the filter and also to avoid the possibility that a clot of water in the line will block all flow. In the case of a planar filter, this clot might cover the entire filter surface and prevent further flow, whereas with a cone, a portion thereof would remain exposed to pass the gasoline.

Such selective filters may also be used as mist eliminators in gaseous systems in which it is important to remove all moisture, the treated sheet being permeable to the gas stream but blocking the passage of all moisture. The same type of filter may be used as a surgical dressing or bandage to permit air flow but to impede aqueous flow.

In the field of toys, one may fabricate a trackway or slide with a super-hydrophobic surface in the manner disclosed hereinabove, and provide travel toys adapted to slide along the track surface. To accomplish this, the surface of this toy which engages the track is made of hydrophilic material and is made wet before use so that a thin film of water is formed thereon. This water film is repelled by the super-hydrophobic surface of the roadway to create a minute air cushion thereon whereby the toy which may be a simulated vehicle or sled or in any other fanciful form, effectively floats on the roadway and the sliding resistance thereto is virtually nil. As a consequence, the slightest applied force or the force of gravity causes the vehicle to travel at high speed for long distances limited only by the length of the toy track. Or one could by means of a retractable, spring-biased plunger, shoot a wet ball or other missile having a hydrophilic surface along a treated track.

Or one can play directly with drops of water by molding a HFSD-treated substrate laminated to a moldable panel to create a maze into which one places a drop of water which may then be manipulated to traverse the maze. By giving the grooves in the maze a V-shaped formation, the resultant internal light reflection in the drops against the inclined walls of the groove produces mirror-like or silvery effects which cause the drop to glitter attractively.

While there have been disclosed preferred embodiments of the invention, it will be appreciated that many changes may be made therein without departing from the essential spirit underlying the invention.

I claim:

1. A product having super-hydrophobic properties, comprising a substrate having a micro-rough face which is physically hydrophobic, said face being coated with hydrophobic fumed silicon dioxide particles which are bonded to said face by a binder having chemical hydrophobic properties, the amount of said binder, by weight relative to the amount of said particles being less than one-half the amount of said particles.

2. A product as set forth in claim 1, wherein said substrate is formed by a layer of closed-cell foam plastic material, the cells of which, on the face of the layer, are cut open to create a multiplicity of projections onto which said particles are bonded.

3. A product as set forth in claim 2, wherein said material is selected from the class consisting of foamed polyethylene and foamed polypropylene.

4. A product as set forth in claim 1, wherein said substrate is formed by spunbonded olefin material.

5. A product as set forth in claim 1, wherein said substrate is formed by spunbonded polyester material.

6. A product as set forth in claim 1, wherein said substrate is in sheet form, the underface of which is adherable to the skin of an aircraft.

7. A product as set forth in claim 1, wherein said binder is formed by polystyrene.

8. The method of fabricating a product having a super-hydrophobic surface comprising the steps of dissolving in a solvent a binder having chemical hydrophobic properties, dispersing in the solvent particles of fumed hydrophobic silicon dioxide to form a flowable coating material, and applying said material to the face of a substrate having a micro-rough surface which is physically hydrophobic, whereby when the solvent is volatilized, the resultant dry coating imparts super-hydrophobic properties to the substrate, the amount of said binder, by weight, relative to the amount of said particles being less than one-half the amount of said particles.

9. The method as set forth in claim 8, wherein said solvent is selected from a class consisting of trichloroethylene, perchloroethylene and benzene.

10. The method as set forth in claim 8, wherein said substrate is formed from chemically-hydrophobic material.

11. The method as set forth in claim 10, wherein said binder is formed of high-impact polystyrene.

12. The method as set forth in claim 7, further including the step of calendering the coated face of said substrate to lock the coating therein.

13. The method as set forth in claim 7, wherein said substrate is constituted by a porous sheet of spunbonded synthetic fibers which when treated is capable of functioning as a selective filter to block the passage of water and to pass other fluids.

* * * * *

UNITED STATES PATENT OFFICE
CERTIFICATE OF CORRECTION

Patent No. 3,931,428   Dated January 6, 1976

Inventor(s) Franklin G. Reick

It is certified that error appears in the above-identified patent and that said Letters Patent are hereby corrected as shown below:

Column 1, line 16 "slim" should have read -- film --
Column 4, line 32 "cuts" should have read -- cut --

Claim 12 line 1 "7" should have read -- 8 --
Claim 13 line 1 "7" should have read -- 8 --

Signed and Sealed this sixth Day of April 1976

[SEAL]

Attest:

RUTH C. MASON
Attesting Officer

C. MARSHALL DANN
Commissioner of Patents and Trademarks